US005160820A

United States Patent [19]

Tsujii et al.

[11] Patent Number: 5,160,820

[45] Date of Patent: Nov. 3, 1992

[54] WELDING TRANSFORMER AND METHOD OF MANUFACTURING SAME

[75] Inventors: Gen Tsujii; Nobuo Kobayashi; Fumitomo Takano, all of Sayama, Japan

[73] Assignee: Honda Giken Kogyo Kabushiki Kaisha, Tokyo, Japan

[21] Appl. No.: 671,110

[22] Filed: Mar. 18, 1991

[30] Foreign Application Priority Data

Mar. 30, 1990 [JP] Japan .......... 2-83319
Mar. 30, 1990 [JP] Japan .......... 2-83322

[51] Int. Cl.[5] .......... B23K 11/24; H01F 19/00

[52] U.S. Cl. .......... 219/116; 29/605; 29/609; 336/65; 336/180

[58] Field of Search .......... 336/223, 232, 65, 180; 29/605, 606, 609; 219/116

[56] References Cited

U.S. PATENT DOCUMENTS

| | | | |
|---|---|---|---|
| 2,242,867 | 5/1941 | Martin | 219/116 |
| 2,840,789 | 6/1958 | Miller | 219/116 |
| 3,112,556 | 12/1963 | Zack | 29/605 |
| 4,460,885 | 7/1984 | Hansen et al. | 336/180 |
| 4,485,289 | 11/1984 | Schwartz | 219/116 |
| 4,652,975 | 3/1987 | Scott | 336/65 |
| 4,819,322 | 4/1989 | Higuchi et al. | 29/605 |
| 5,023,423 | 6/1991 | Tsujii et al. | 219/116 |

FOREIGN PATENT DOCUMENTS

| | | |
|---|---|---|
| 0035964 | 9/1981 | European Pat. Off. . |
| 0216249 | 4/1987 | European Pat. Off. . |
| 60-180683 | 9/1985 | Japan . |
| 61-33620 | 10/1986 | Japan . |
| 563452 | 8/1944 | United Kingdom . |
| 1072115 | 6/1967 | United Kingdom . |
| 2071921 | 9/1981 | United Kingdom . |
| 2191427 | 12/1987 | United Kingdom . |
| 84/00638 | 2/1984 | World Int. Prop. O. . |

*Primary Examiner*—Geoffrey S. Evans

[57] ABSTRACT

A welding transformer for use in a resistance welding machine has primary and secondary coils. The primary coil includes a plurality of spaced juxtaposed coil units mounted on a base board. Each of the coil units includes a plurality of juxtaposed coil unit elements with insulating members interposed therebetween. Each of the coil unit elements includes a plurality of turns of a conductive member, and a plurality of conductors mounted on the base board and electrically interconnecting the coil unit elements. A pair of cores is combined with the coil units.

11 Claims, 10 Drawing Sheets

WELDING TRANSFORMER AND METHOD OF MANUFACTURING SAME

BACKGROUND OF THE INVENTION

1. Field of the Invention:

The present invention relates to a welding transformer and a method of manufacturing such a welding transformer, and more particularly to a high-frequency welding transformer, which is small in size and light in weight, for use in an inverter-type resistance welding machine, and a method of manufacturing such a high-frequency welding transformer.

2. Description of Background Art:

Heretofore, resistance welding robots are widely used on automobile production lines, for example, in order to supply large electric currents to workpieces which are to be welded.

An inverter-type DC resistance welding machine has been employed for such a welding robot. In the inverter-type DC resistance welding machine, a direct current is converted into a high frequency alternating current which is then supplied to a welding transformer to lower its voltage. Then, the alternating current is rectified by a rectifying circuit into a direct current which is supplied to a welding gun arm. The direct current is first converted into the high-frequency alternating current because the welding transformer may be relatively small in size and light in weight since the cross-sectional area of the core of the welding transformer is inversely proportional to the frequency of the high-frequency alternating current.

One welding transformer of the above kind is disclosed in Japanese Utility Model Publication No. 61(1986)-33620, for example. The disclosed welding transformer comprises a primary coil composed of a number of turns, a transformer core, and a secondary coil composed of one turn and having a center tap. The welding transformer is in actual use in a frequency range from several hundred Hz to 1 KHz.

SUMMARY OF THE INVENTION

It is an object of the present invention to provide a welding transformer which is reduced in size and weight through overcoming the drawback of a skin effect that is caused when the frequency of a current flowing in the transformer is increased.

Another object of the present invention is to provide a method of manufacturing the above welding transformer.

According to the present invention, there is provided a welding transformer comprising primary and secondary coils disposed closely to each other, a base board, one of the primary and secondary coils comprising a plurality of spaced juxtaposed coil units mounted on the base board, each of the coil units comprising a plurality of juxtaposed coil unit elements with insulating members interposed therebetween, each of the coil unit elements comprising a plurality of turns of a conductive member, and a plurality of conductors mounted o the base board and electrically interconnecting the coil unit elements, and a core disposed closely to the coil units.

The coil unit elements and the insulating members have respective spaces defined centrally therein, the core being inserted through the spaces. The base board has a plurality of as many holes or apertures, hereinafter referred to as holes, as the number of the coil unit elements, the coil unit elements having ends inserted into the holes, respectively, thereby securing the coil units to the base board. The holes are grouped into upper and lower series of holes arranged in a longitudinal direction of the base board, the upper and lower series of holes lying parallel to each other. The holes are grouped into a plurality of sets of series of holes, the conductors extending from one of the series of holes in one set to one of the series of holes in another set, thereby connecting at least two of the coil units in series to each other.

Each of the coil unit elements comprises the conductive member wound as the turns concentrically, and a thin insulating member interposed between the turns.

The welding transformer further includes at least two terminal assemblies mounted on the base board, and an inverter connected to the terminal assemblies, the terminal assemblies being connected to the coil units which are connected in series to each other.

The welding transformer further includes a support, each of the coil units being supported on the support, the support being fixed to the base board. The support comprises first and second panels spaced from each other, the coil unit elements being disposed between the first and second panels. The support further includes a tube extending between and joined to the first and second panels, and a plurality of substantially parallel insulating plates mounted on the tube, the coil unit elements being disposed between the insulating plates. The insulating plates are inclined with respect to the first and second panels.

According to the present invention, there is also provided a method of manufacturing a welding transformer, comprising the steps of laminating an insulating member to a thin conductive member, winding the insulating member and the thin conductive member, cutting the insulating member and the thin conductive member into slices as coil unit elements in a direction transverse to the insulating member and the thin conductive member, placing the coil unit elements adjacent to each other to produce coil units, mounting the coil units on a base board while electrically connecting the coil unit elements of the coil units, and installing a core on the coil units. The method further includes the step of interposing thin insulating members between the coil unit elements when the coil units are produced.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

First, a process of manufacturing a primary coil will be described below with reference to FIG. 1.

Figure 1:
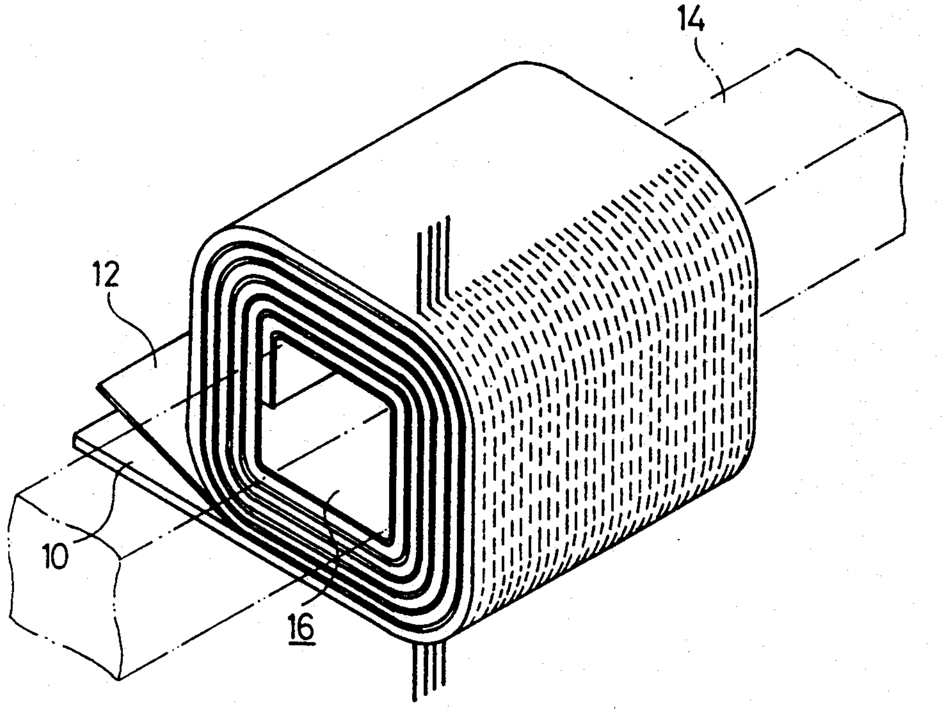
FIG. 1 is a perspective view showing the manner in which coil unit elements of a welding transformer according to the present invention are manufactured.
Figure 2:
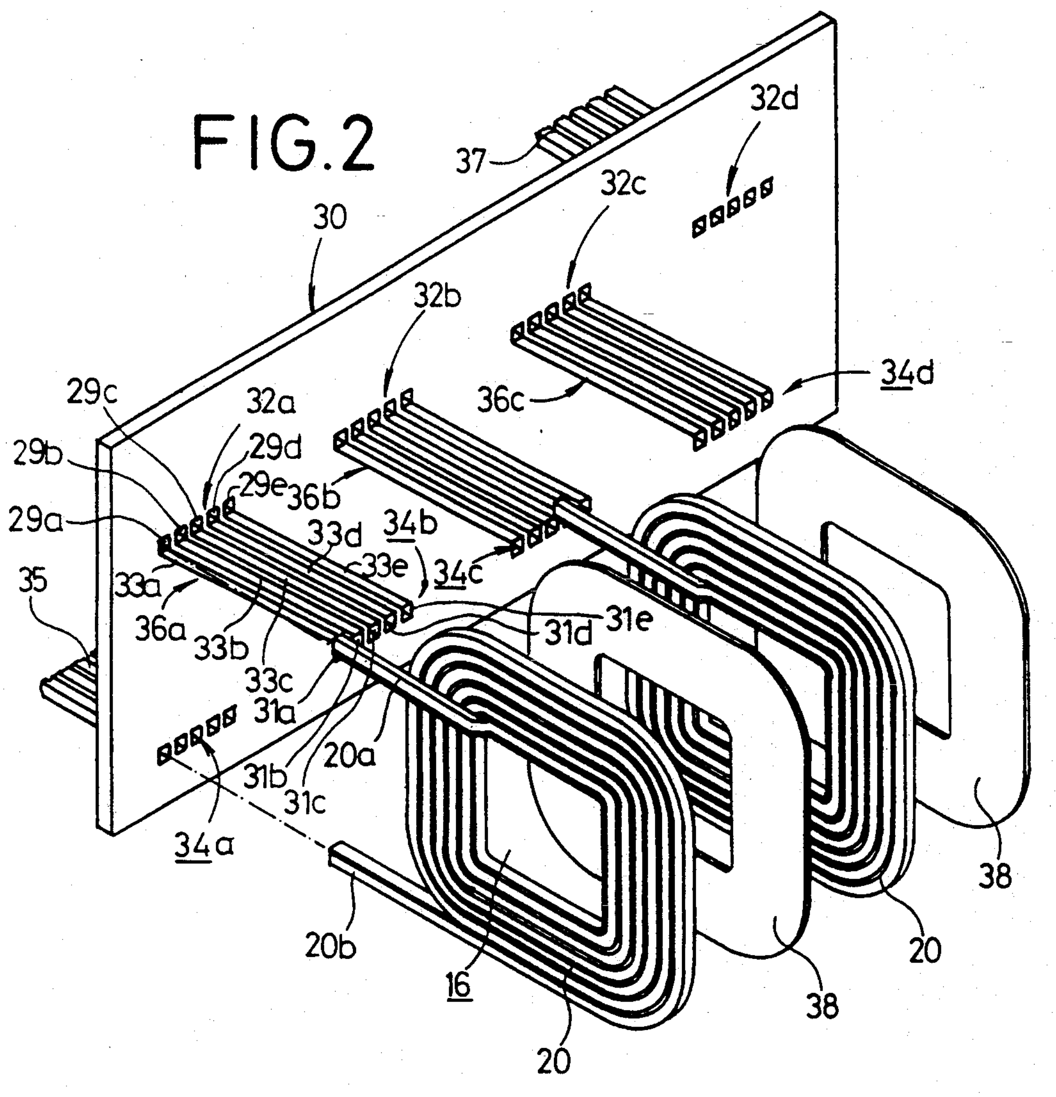
FIG. 2 is a perspective view showing the manner in which ends of coil unit elements shown in FIG. 1 are inserted into a base board.

As shown in FIG. 1, an insulating film 12 is laminated to a thin copper sheet 10 which is coated with an adhesive on both surfaces. The copper sheet 10 and the insulating film 12 are then wound around a core 14 of synthetic resin. Then, the copper sheet 10, the insulating film 12, and the core 14 are cut off into thin slices each having a width of preferably 1 mm by a wire cutting process, as indicated by broken lines. At this time, the copper sheet 10, the insulating film 12, and the core 14 are cut off in a direction normal thereto. Then, the thin core 14 is removed from each slice, defining a central space 16 in the laminated slice of the copper sheet 10 and the insulating film 12. The resultant slice is used as a coil unit element 20 as shown in FIG. 2. The coil unit element 20 has an end 20*a* extending horizontally in FIG. 2 and an opposite end 20*b* also extending horizontally in FIG. 2.

The coil unit elements 20 are mounted on a base board 30. As shown in FIG. 2, the base board 30 has a hole or aperture series 32*a* through 32*d*, hereinafter referred to as holes, each receiving five coil unit elements 20 parallel to each other, and a hole or aperture series 34*a* through 34*d*, hereinafter referred to as holes, positioned below and extending parallel to the hole series 32*a* through 32*d*, respectively, in the longitudinal direction of the base board 30. The hole series 32*a* comprises five holes 29*a* through 29*e*, and the hole series 34*b* comprises five holes 31*a* through 31*e*. The holes 29*a* through 29*e* are electrically connected to the respective holes 31*a* through 31*e* by a wiring pattern 36*a* which comprises five inclined conductors 33*a* through 33*e*. Similarly, the five holes of the hole series 32*b* are electrically connected to the respective five holes of the hole series 34*c* by a wiring pattern 36*b* composed of five inclined conductors. The five holes of the hole series 32*c* are also electrically connected to the respective five holes of the hole series 34*d* by a wiring pattern 36*c* composed of five inclined conductors. Each of the hole series 32*d*, 34*a* also comprises five holes.

The ends 20*a* of five coil unit elements 20 are inserted into the respective holes 29*a* through 29*e* of the hole series 32*a* and the ends 20*b* thereof are inserted into the respective holes of the hole series 34*a*. Likewise, the ends 20*a* of other five coil unit elements 20 are inserted into the respective holes of the hole series 32*b* and the ends 20*b* thereof are inserted into the respective holes 31*a* through 31*e* of the hole series 34*b*. The ends 20*a* of other five coil unit elements 20 are inserted into the respective holes of the hole series 32*c* and the ends 20*b* thereof are inserted into the respective holes of the hole series 34*c*. The ends 20*a* of other five coil unit elements 20 are inserted into the respective holes of the hole series 32*d* and the ends 20*b* thereof are inserted into the respective holes of the hole series 34*d*. Insulating films 38 which are substantially identical in shape to the coil unit elements 20 are interposed between the coil unit elements 20.

Therefore, the five juxtaposed coil unit elements 20 are mounted on the base board 30 between the hole series 32*a*, 34*a* and electrically connected to the five juxtaposed coil unit elements 20 which are mounted on the base board 30 between the hole series 32*b*, 34*b*, through the conductors 33*a* through 33*e* of the wiring pattern 36*a*. The coil unit elements 20 mounted on the base board 30 between the hole series 32*b*, 34*b* are electrically connected to the five juxtaposed coil unit elements 20 which are mounted on the base board 30 between the holes series 32*c*, 34*c*, through the wiring pattern 36*b*. The coil unit elements 20 mounted on the base board 30 between the hole series 32*c*, 34*c* are electrically connected to the five juxtaposed coil unit elements 20 which are mounted on the base board 30 between the hole series 32*d*, 34*d*, through the wiring pattern 36*c*. The ends 20*b* of the coil unit elements 20 which are inserted in the hole series 34*a* are connected to a terminal assembly 35 which is mounted on the reverse side of the base board 30 and extends from the hole series 34*a*. Similarly, the ends 20*a* of the coil unit elements 20 which are inserted in the hole series 32*d* are connected to a terminal assembly 37 which is mounted on the reverse side of the base board 30 and extends from the hole series 32*d*. The terminal assemblies 35, 37 are connected to an inverter (described later on). The ends 20*a*, 20*b* of the coil unit elements 20 are soldered or otherwise securely electrically connected to the conductors and the terminal assemblies when they are inserted in the hole series 32*a* through 32*d*, 34*a* through 34*d*.

Figure 3:
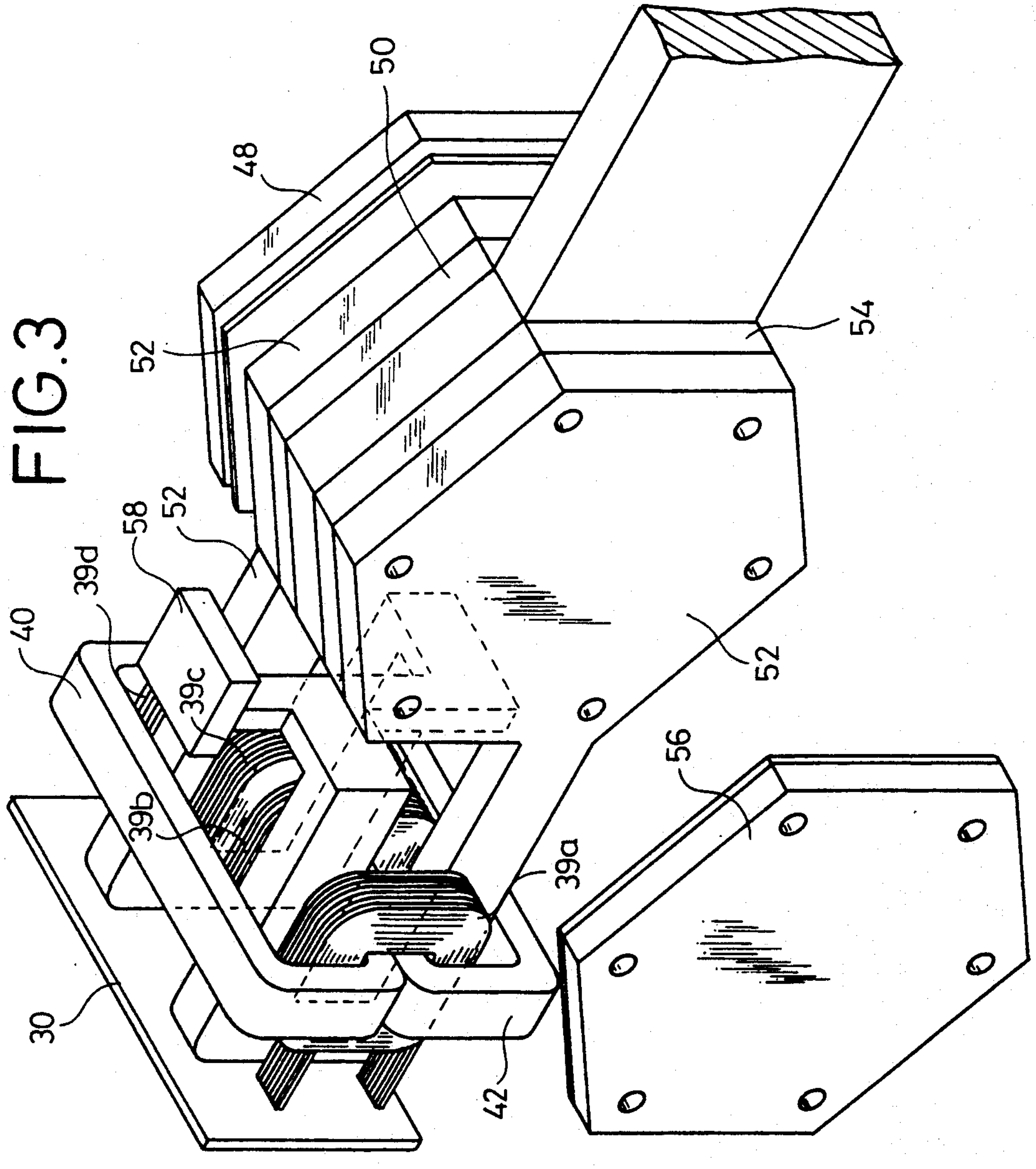
FIG. 3 is an exploded perspective view showing the manner in which a welding transformer composed of primary and secondary sides is assembled with coil units mounted on the base board.

As shown in FIG. 3, the coil unit elements 20 thus mounted in groups on the base board 30 are referred to as coil units 39*a* through 39*d*. Cores 40, 42 are mounted on the coil units 39*a* through 39*d*, with core portions extending through the spaces 16 defined in the coil unit elements 20. Each of the cores 40, 42 is in the form of a rectangular parallelepiped with round corners, and comprises a laminated assembly of thin steel sheets as well known in the art. The coil units 20 jointly serve as a primary coil.

Figure 4:
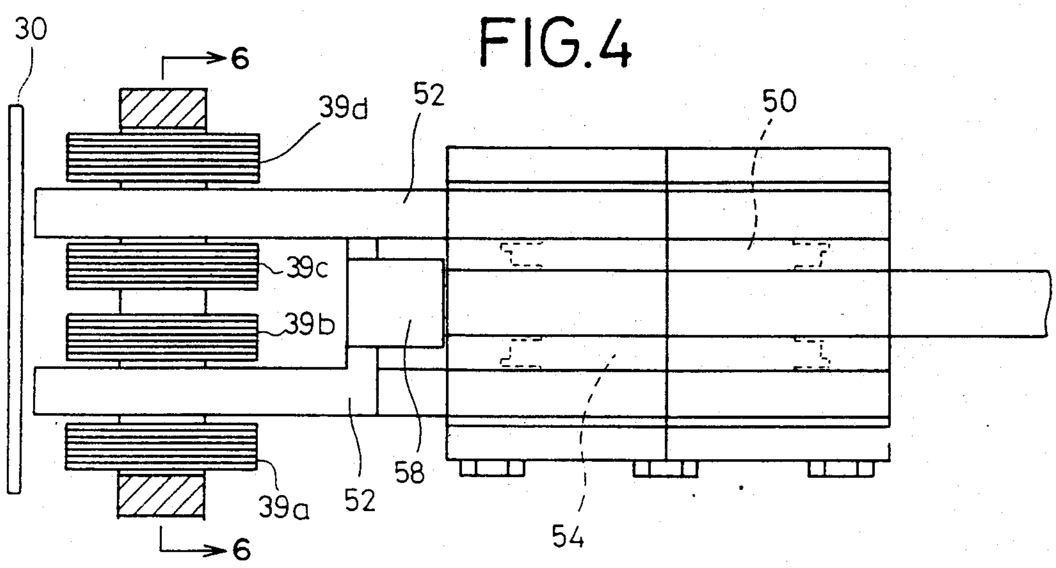
FIG. 4 is a plan view of the welding transformer shown in FIG. 3.
Figure 5:
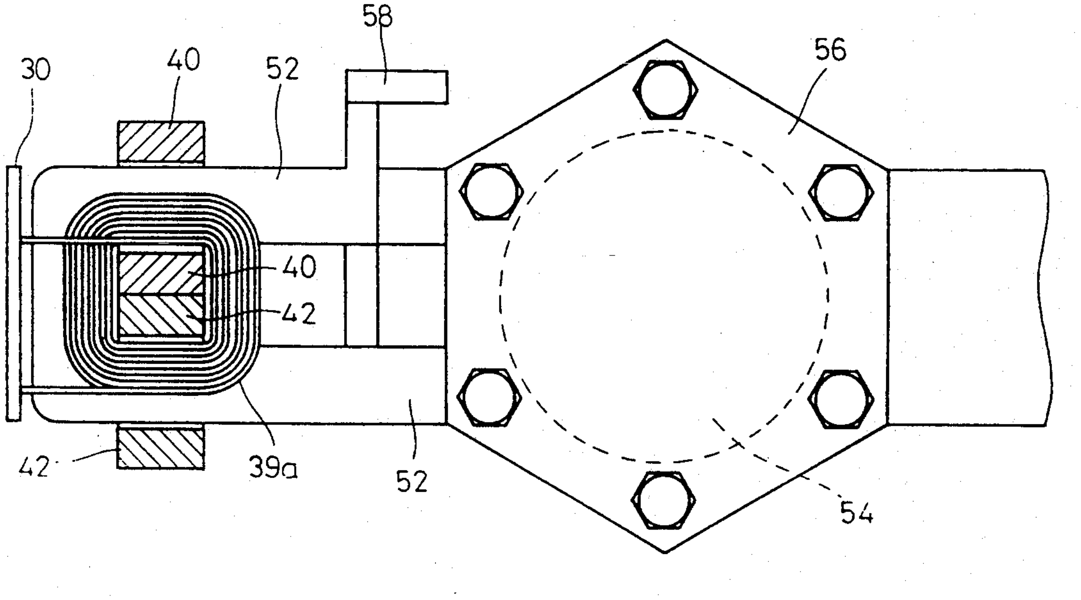
FIG. 5 is a front elevational view of the welding transformer shown in FIGS. 3 and 4.

A secondary coil comprises a conductor 52 shown in FIGS. 3 through 5. More specifically, a pair of first and second hexagonal diodes 50, 54 are mounted respectively on opposite surfaces of a central diode mount. The conductor 52 has two hexagonal end portions electrically connected respectively to the principal outer surfaces of the first and second diodes 50, 54, and an intermediate elongate portion of a rectangular cross section extending between the hexagonal end portions. The intermediate elongate portion extends from the hexagonal end portion on the diode 50 horizontally toward the base board 30, then through the space of the core 40, is bent downwardly along the base board 30, and then extends horizontally away from the base board 30 toward the first diode 50 through the space of the core 42. Then, the intermediate elongate portion extends parallel to the base board 30, rises upwardly, then extends horizontally parallel to the base board 30, is bent toward the base board 30 through the space of the core 40, directed downwardly along the base board, and then extends horizontally away from the base board 30 through the space of the core 42 toward the other hexagonal end portion on the second diode 54. The central support 51, the first and second diodes 50, 54, and the hexagonal end portions of the conductor 52 are firmly sandwiched between hexagonal plates 48, 56 by bolts (not shown). A center tap 58 is connected to a central region of the intermediate elongate portion of the conductor 52.

Figure 6:
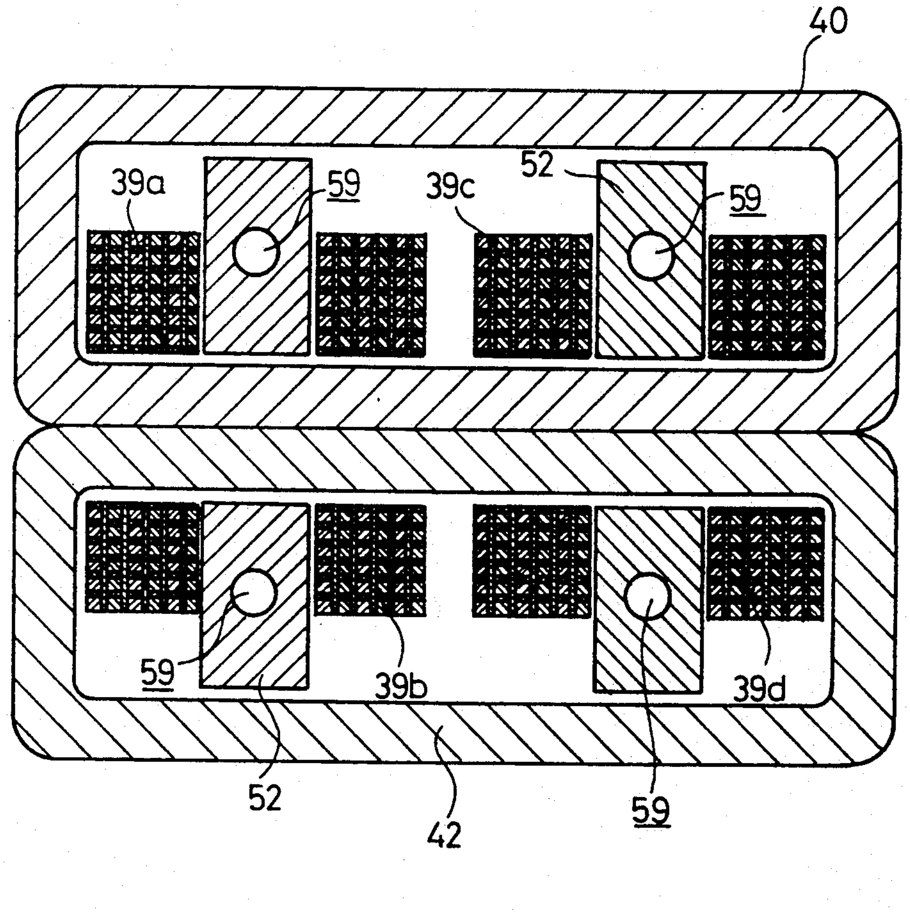
FIG. 6 is an enlarged cross-sectional view taken along line 6—6 of FIG. 4.

As shown in FIG. 6, the conductor 52 has a passage 59 defined therethrough for allowing a coolant to flow therethrough to effectively cool the welding transformer during operation.

Figure 7:
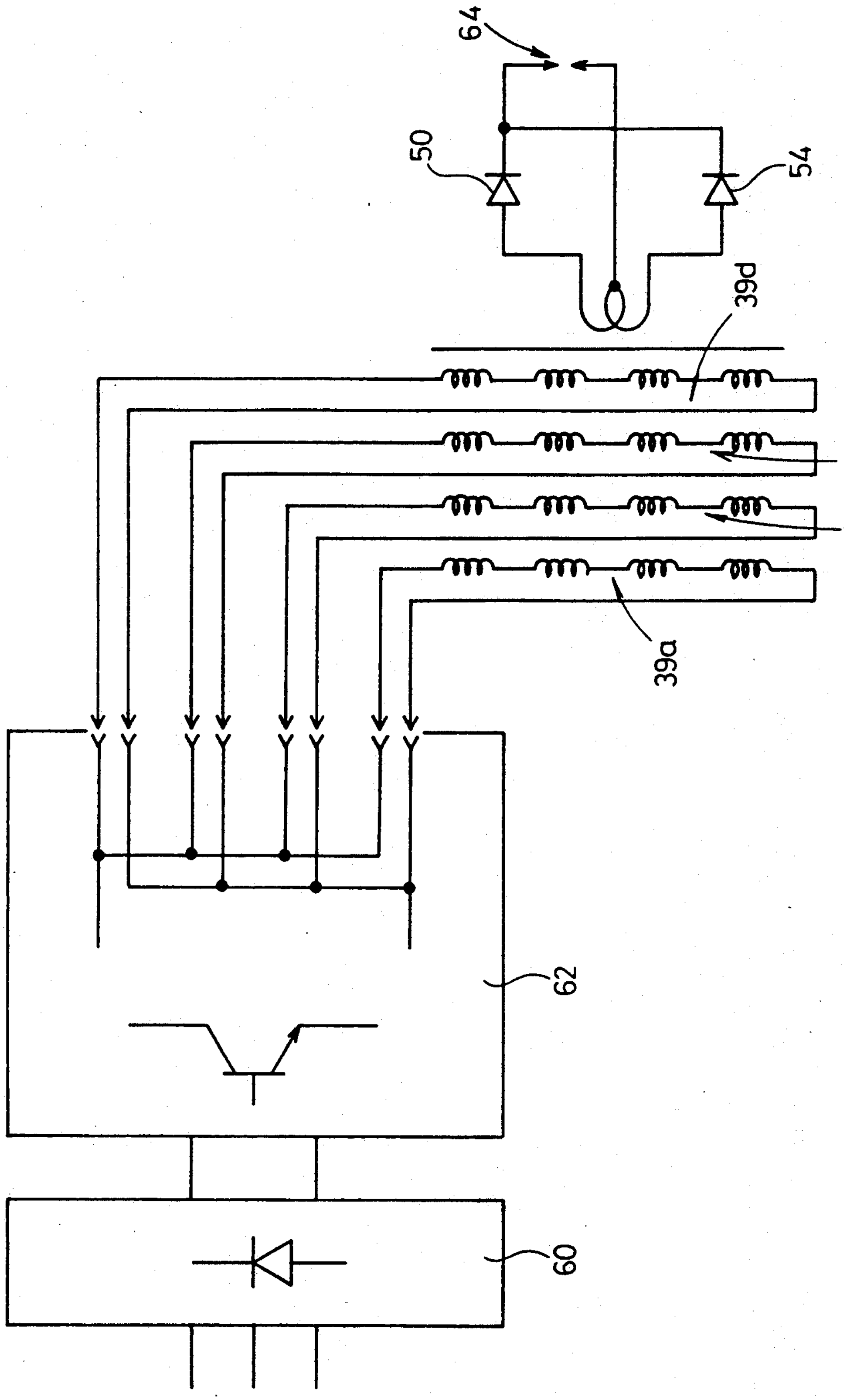
FIG. 7 is an electric circuit diagram of the welding transformer shown in FIGS. 3 through 6.

FIG. 7 shows an electric circuit arrangement of the welding transformer thus constructed. The electric circuit arrangement includes a rectifying circuit 60 connected to a three-phase 400V AC power supply (not shown). The rectifying circuit 60 supplies a direct current to an inverter 62 which then produces a square-wave current. When supplied with the square-wave current, the coil units 39*a* through 39*d*, the first diode 50, and the second diode 54 produce a direct current available from the secondary coil, and the produced direct current is supplied to a welding gun 64.

In this embodiment, the primary coil of the welding transformer is manufactured by laminating an insulating film to a thin conductive sheet, winding the insulating film and the thin conductive sheet around a core, cutting them into thin slices as coil unit elements 20 which are grouped into coil units 39*a* through 39*d*, and inserting the ends of the coil units 39*a* through 39*d* into hole series 32*a* through 32*d* and 34*a* through 34*d* defined in a base board 30. Since the holes 32*a* through 32*d* and 34*a* through 34*d* are electrically connected through conductors, the primary coil units are composed of many turns and have a large surface area.

Each of the coil units 39*a* through 39*d* has five turns and comprises five coil unit elements 20, and these coil units 39*a* through 39*d* are juxtaposed in the cores 40, 42. Since the conductors through which a welding current flows have a large surface area, a large welding current flows without being adversely affected by the skin effect. The coil unit elements can easily be manufactured and handled because they are composed of an insulating film and a thin conductive sheet as of copper, the insulating film and the thin conductive sheet being cut off into thin slices.

Figure 9:
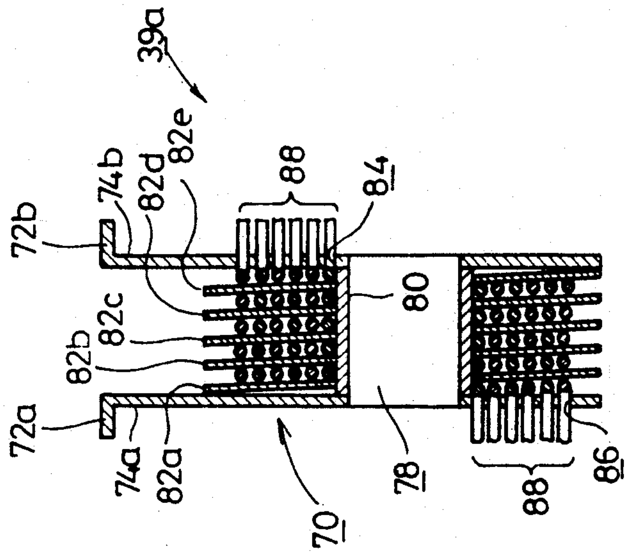
FIG. 9 is a vertical cross-sectional view of the coil unit shown in FIG. 8.
Figure 8:
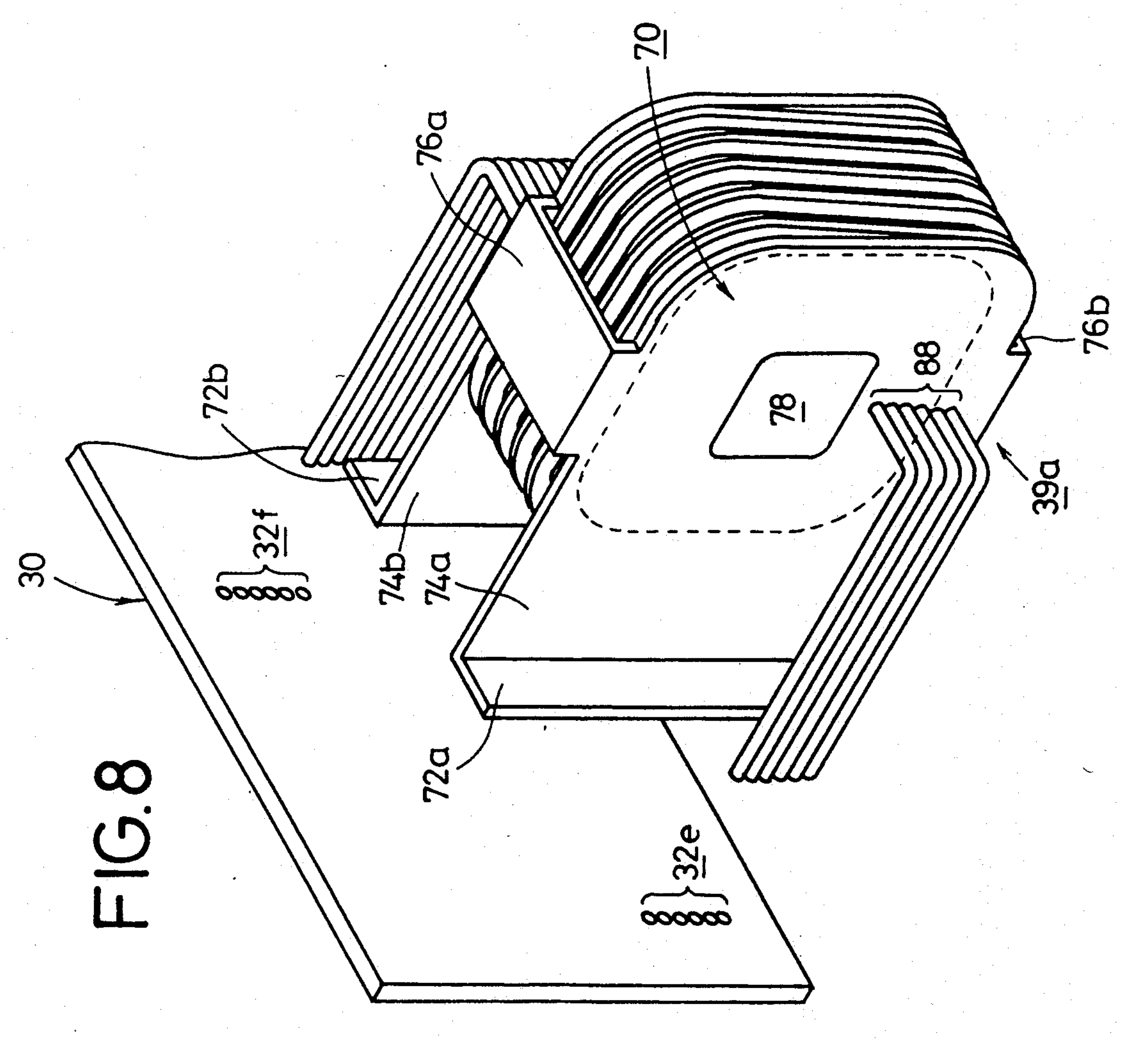
FIG. 8 is a fragmentary perspective view of a coil unit and a base board of a welding transformer according to another embodiment of the present invention.
Figure 10:
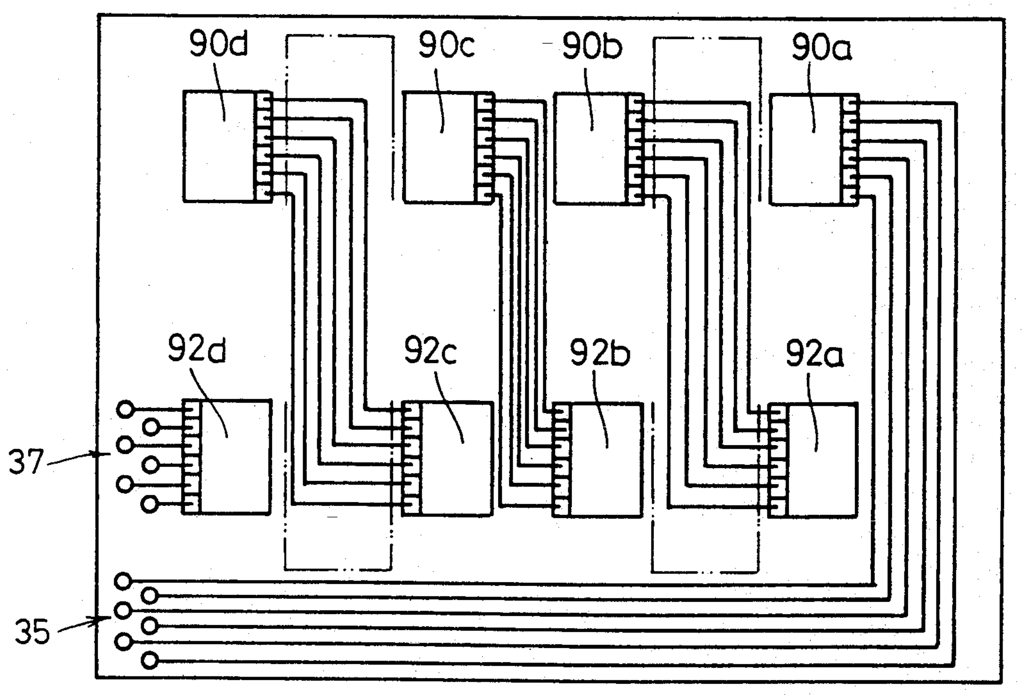
FIG. 10 is a view of the reverse side of the base board shown in FIG. 8, the view showing a wiring arrangement.

FIGS. 8 through 10 illustrate a welding transformer according to another embodiment of the present invention. Those parts shown in FIGS. 8 through 10 which are identical to those of the previous embodiment are denoted by identical reference numerals, and will not be described in detail.

As shown in FIGS. 8 and 9, a support 70 comprises a first panel 74*a* having a flange 72*a* and a second panel 74*b* having a flange 72*b*. The first and second panels 74*a*, 74*b* are interconnected to and spaced from each other by a pair of bridge members 76*a*, 76*b*. A hole 78 of a rectangular cross section is defined in and extends between the first and second panels 74*a*, 74*b*. Specifically, the hole 78 is defined by a rectangular tube 78 of a rectangular cross section which is joined to and extends between the first and second panels 74*a*, 74*b*. The first and second panels 74*a*, 74*b* are thus spaced from each other and rigidly supported by the rectangular tube 78 as well as the bridge members 76*a*, 76*b*. In a space defined between the first and second panels 74*a*, 74*b*, there are disposed substantially parallel oblique plates 82*a* through 82*e* which are inclined at an angle to the plane in which the first and second panels 74*a*, 74*b* lie. The first panel 74*a* has six holes 84 defined therein and arrayed parallel to the flange 72*a*, and the second panel 74*b* also has six holes 86 defined therein and arrayed parallel to the flange 72*b*.

Six insulated conductive wires 88 are successively inserted through the holes 84 into the space between the first and second panels 74*a*, 74*b*, wound between the oblique plates 82*a* through 82*e*, and extended out of the holes 86. Therefore, the insulated conductive wires 88 are wound in six layers between the oblique plates 82*a* through 82*e*. As shown in FIG. 9, the resultant assembly serves as a coil unit 39*a* having six divisions each with six turns. The coil unit 39*a* is then mounted on a base board 30. More specifically, the flanges 72*a*, 72*b* are secured to the base board 30 by an adhesive or the like, and the conductive wires 88 from the holes 84 inserted through a series of holes 32*c* defined in the base board 30 and the conductive wires 88 from the holes 86 through a series of holes 32*f* defined in the base board 30. Although not shown, other coil units 39*b*, 39*c*, 39*d*, each identical to the coil unit 39*a* above, are also mounted on the base board 30 in the same manner.

As shown in FIG. 10, four upper terminals 90*a* through 90*d* and four lower terminals 92*a* through 92*d* are disposed on the reverse side of the base board 30 on which the coil units 39*a* through 39*d* are mounted. The terminals 90*b*, 92*a* are electrically connected to each other by conductors, the terminals 90*c*, 92*b* are electrically connected to each other by conductors, and the terminals 90*d*, 92*c* are electrically connected to each other by conductors. The terminals 90*a*, 92*d* are electrically connected to an inverter through terminal assemblies 35, 37. As with the previous embodiment, cores 40, 42 are inserted the hole 78 of each of the coil units 39*a* through 39*d* mounted on the base board 30.

Figure 12:
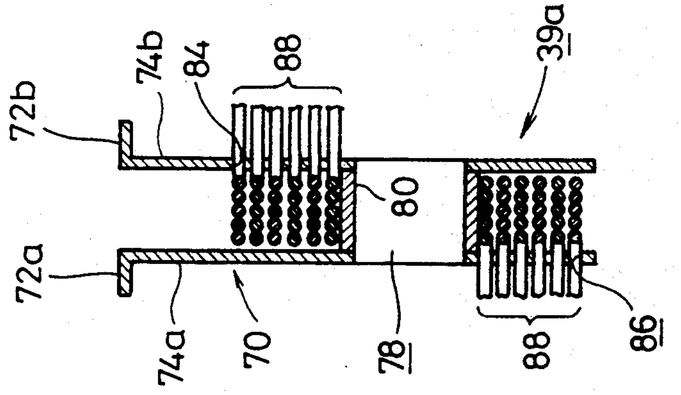
FIG. 12 is a vertical cross-sectional view of the coil unit shown in FIG. 11.
Figure 11:
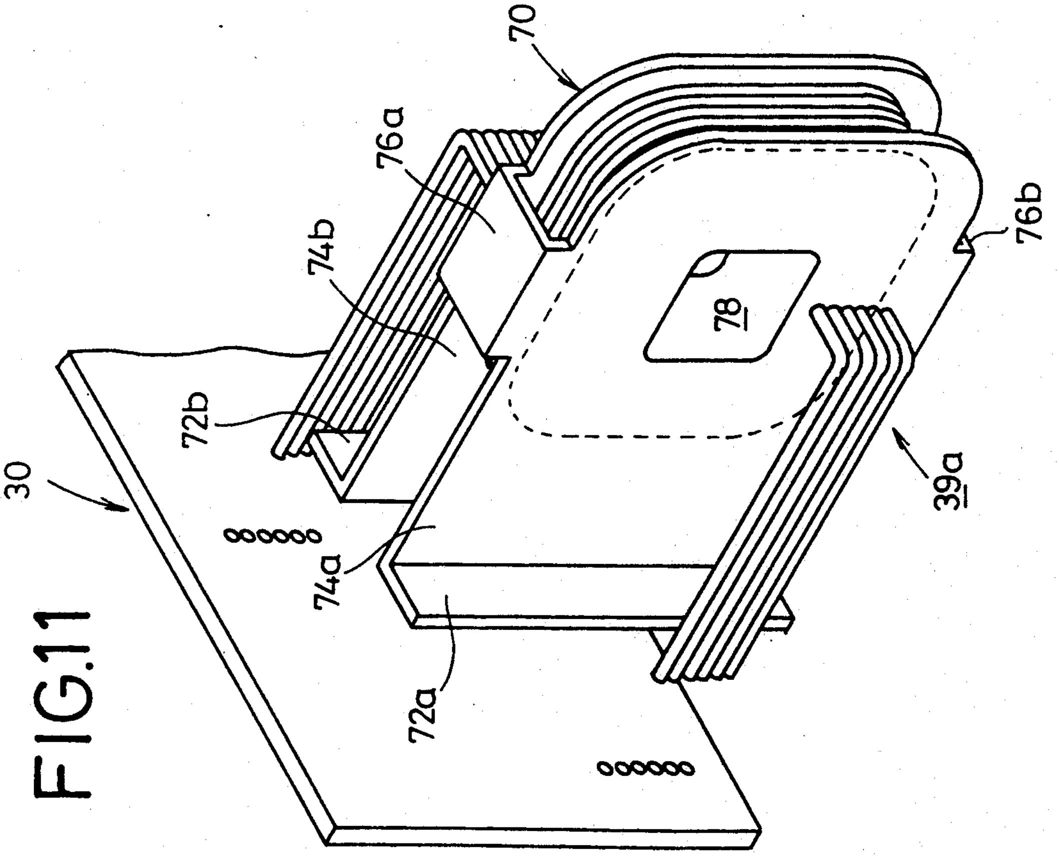
FIG. 11 is a fragmentary perspective view of a coil unit and a base board of a welding transformer according to still another embodiment of the present invention.

FIGS. 11 and 12 show a welding transformer according to still another embodiment of the present invention. Those parts shown in FIGS. 11 and 12 which are identical to those of the previous embodiments are denoted by identical reference numerals, and will not be described in detail.

The welding transformer shown in FIGS. 11 and 12 differs from the welding transformer shown in FIGS. 8 through 10 in that no oblique plates are employed and the insulated conductive wires 88 are wound simply around the support 70. The coil units 39*a* through 39*d* shown in FIGS. 11 and 12 are simpler in construction.

Figure 14:
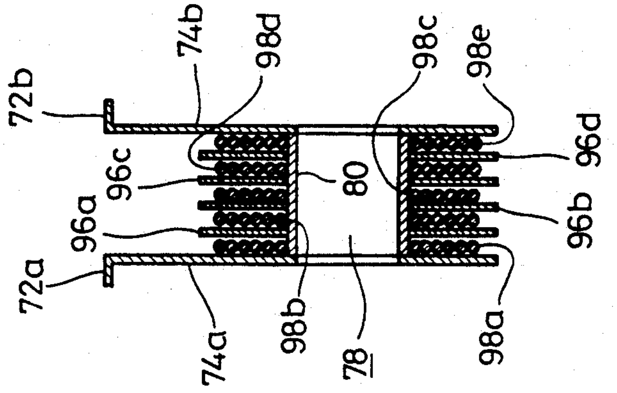
FIG. 14 is a vertical cross-sectional view of the coil unit shown in FIG. 13.
Figure 13:
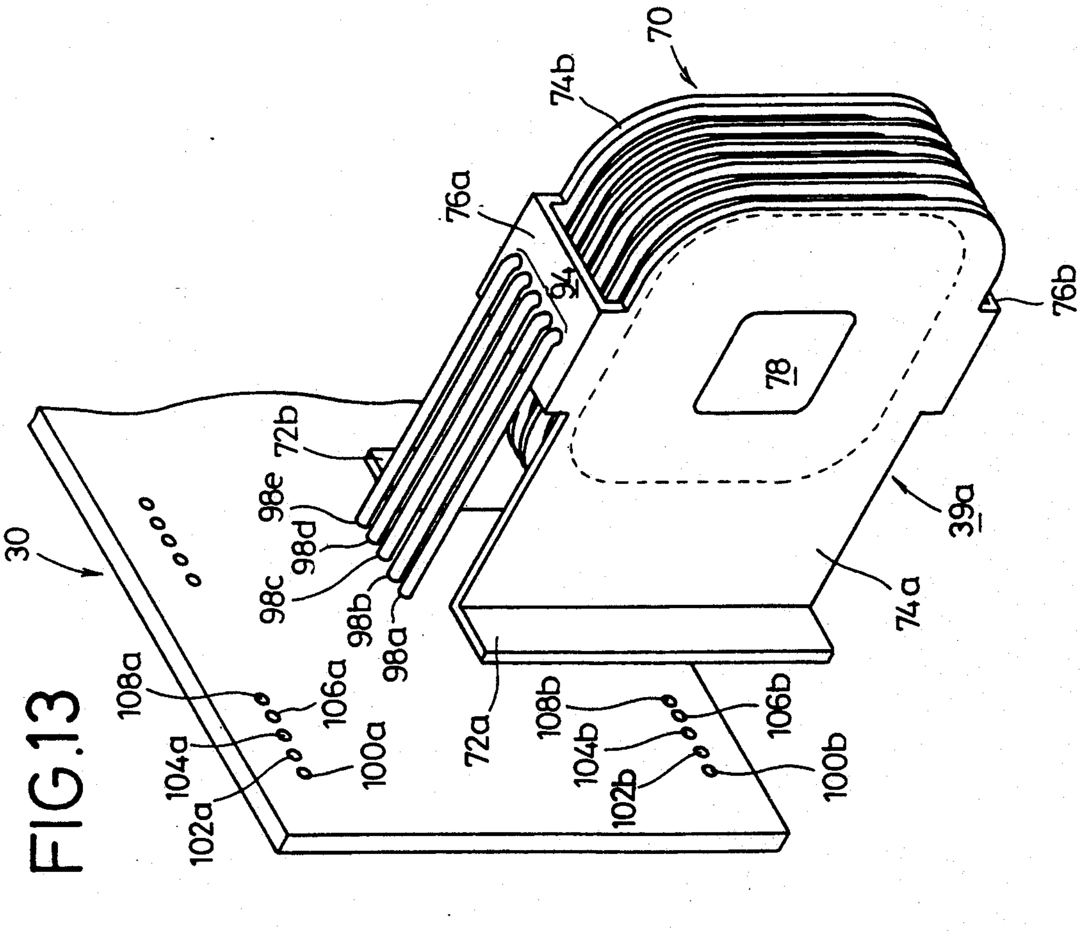
FIG. 13 is a fragmentary perspective view of a coil unit and a base board of a welding transformer according to yet another embodiment of the present invention.

FIGS. 13 and 14 show a welding transformer according to yet another embodiment of the present invention. As shown in FIGS. 13 and 14, a coil unit 39*a* has two bridge members 76*a*, 76*b* interconnecting first and second panels 74*a*, 74*b*, each of the bridge members 76*a*, 76*b* having an array of five holes 94. Equally spaced insulating plates 96*a* through 96*d* are mounted on a rectangular tube 80 which extends between the first and second panels 74*a*, 74*b* and defines a hole 78. A first conductive wire **98*a* is wound between the first panel 74*a* and the insulating plate 96*a*, and has one end extending through one of the holes 94 into an upper hole 100*a* defined in a base board 30. The other end of the first conductive wire 98*a* extends through one of the holes in the bridge member 76*b* into a lower hole 100*b* defined in the base board 30. Likewise, second through fifth conductive wires 98*b*, 98*c*, 98*d*, 98*e* are wound between the insulating plates 96*a*, 96*b*, between the insulating plates 96*b*, 96*c*, between the insulating plates 96*c*, 96*d*, and between the insulating plate 96*d* and the second panel 74*b*, and have ends extends through the holes 94 in the bridge members 76*a*, 76*b* into upper and lower holes 102*a*, 104*a*, 106*a*, 108*a* and 102*b*, 104*b*, 106*b*, 108*b* in the base board 30. Other coil units 39*b*, 39*c*, 39*d*** (not shown) are of the same construction.

The reverse side of the base board 30 shown in FIG. 13 has basically the same wiring arrangement as that shown in FIG. 10, except that it is slightly modified because of the conductive wires **98*a* through 98*e* extending from the bridge members 76*a*, 76*b***.

According to the present invention, as described above, the primary coil of the welding transformer is composed of divided and insulated conductive wires. The surface area of the primary coil is therefore much larger than that of a primary coil which is constructed of a single flat conductive wire. Accordingly, the problem of a skin effect wherein a current flows near the surface of the conductive wire can be solved, and a current can flow efficiently through the conductive wires in their entirety. Since the primary coil is constructed in a balanced arrangement simply by inserting the ends of the coil units into the base board and fixing the coil units to the base board, the primary coil is stable in welding operation.

Inasmuch as the welding transformer is simple in structure, it can be manufactured inexpensively, is not subjected to frequency failures, and allows any parts to be replaced easily even when it fails. The welding transformer according to the present invention may be small in size and light in weight.

Furthermore, the coil unit elements are produced by laminating an insulating film to a thin metal sheet, winding them, and cutting them off into thin slices. Consequently, the coil unit elements with a large surface area can easily be fabricated.

Since the welding transformer can be manufactured simply, the cost of manufacture of the welding transformer is low and hence the welding transformer is inexpensive as a whole.

Although certain preferred embodiments have been shown and described, it should be understood that many changes and modifications may be made therein without departing from the scope of the appended claims.

What is claimed is:

1. A welding transformer comprising:

primary and secondary coils disposed closely to each other;

a base board;

one of said primary and secondary coils comprising a plurality of spaced juxtaposed coil units mounted on said base board, each of said coil units comprising a plurality of juxtaposed coil unit elements with insulating members interposed therebetween, each of said coil unit elements comprising a plurality of turns of a conductive member, and a plurality of conductors mounted on said base board and electrically interconnecting said coil unit elements; and a core disposed closely to said coil units;

said base board having a plurality of apertures corresponding to the number of the coil unit elements, said coil unit elements having ends inserted into said apertures, respectively, thereby securing said coil units to said base board.

2. A welding transformer according to claim 1, wherein said coil unit elements and said insulating members have respective spaces defined centrally therein, said core being inserted through said spaces.

3. A welding transformer according to claim 1, wherein each of said coil unit elements comprises said conductive member wound as said turns concentrically, and a thin insulating member interposed between said turns.

4. A welding transformer according to claim 1, wherein said apertures are grouped into upper and lower series of apertures arranged in a longitudinal direction of said base board, said upper and lower series of apertures lying parallel to each other.

5. A welding transformer according to claim 1, wherein said apertures are grouped into a plurality of sets of series of apertures, said conductors extending from one of the series of apertures in one set to one of the series of apertures in another set, thereby connecting at least two of said coil units in series to each other.

6. A welding transformer according to claim 5, further including at least two terminal assemblies mounted on said base board, and an inverter connected to said terminal assemblies, said terminal assemblies being connected to said coil units which are connected in series to each other.

7. A welding transformer according to claim 1, further including a support, each of said coil units being sup ported on said support, said support being fixed to said base board.

8. A welding transformer according to claim 7, wherein said support comprises first and second panels spaced from each other, said coil unit elements being disposed between said first and second panels.

9. A welding transformer according to claim 8, wherein said support further includes a tube extending between and joined to said first and second panels, and a plurality of substantially parallel insulating plates mounted on said tube, said coil unit elements being disposed between said insulating plates.

10. A welding transformer according to claim 9, wherein said insulating plates are inclined with respect to said first and second panels.

11. A method of manufacturing a welding transformer, comprising the steps of:

laminating an insulating member to a thin conductive member;

winding said insulating member and said thin conductive member;

cutting said insulating member and said thin conductive member into slices as coil unit elements in a direction transverse to said insulating member and said thin conductive member;

placing a plurality of said coil unit elements adjacent to each other and interposing thin insulating members between said coil unit elements to produce coil units;

mounting said coil units on a base board, said base board having a plurality of apertures therein corresponding to the number of the coil unit elements, by inserting respective ends of said coil unit elements into said apertures, thereby securing said coil units to said base board;

electrically connecting the coil unit elements of the coil units; and installing a core on said coil units.

* * * * *